June 7, 1960 M. L. BUTCHER 2,939,756
AUTOMOBILE TRAVEL KIT BOX
Filed July 22, 1955 2 Sheets-Sheet 1

INVENTOR.
MAUDE L. BUTCHER
BY
Smith & Tuch
ATTORNEYS

June 7, 1960 M. L. BUTCHER 2,939,756
AUTOMOBILE TRAVEL KIT BOX
Filed July 22, 1955 2 Sheets-Sheet 2

INVENTOR.
MAUDE L. BUTCHER
BY
Smith & Tuck
ATTORNEYS

United States Patent Office 2,939,756
Patented June 7, 1960

2,939,756

AUTOMOBILE TRAVEL KIT BOX

Maude L. Butcher, 6052 48th Ave. SW., Seattle, Wash.

Filed July 22, 1955, Ser. No. 523,676

2 Claims. (Cl. 312—282)

This present invention relates to the general art of kit boxes, and relates more particularly to a unit suitable for use for the automobile travelers or small boating enthusiasts, which will contain, in accurately positioned racks or partitions or holders, the various items required for taking a light snack-type meal, as a breakfast for instance, when the night may be spent at a point remote from public eating houses. Provisions are made so that all the essential utensils and equipment are provided which will enable a man to shave and wash, or for a woman to make up her toilet. The unit is provided with foldable panels so that a reasonably sized table, of a low type, may be provided so that a game of cards can be engaged in, if desired. All the essential items are thus provided to serve the normally expected needs of an automobile traveler, all in a very compact kit arrangement where there is a definite place for every item, to the end that no time will be lost in searching for the desired item even if camp is made after darkness or left before daylight.

Due to the fact that there are large numbers of persons, of somewhat limited means, who travel about the country a great deal in automobiles, a large number of the States have provided State parks or highway parks which provide merely the bare essentials, such as water and restroom facilities, and a limited area in which a car can be parked overnight. Many of these auto parks are situated in remote places of scenic value or where fishing or recreational facilities are available. In any extended trip, however, there is always a shortage of actual carrying space in the ordinary automobile so that any light camping equipment that is carried along must, on one hand, be as compact as possible and, secondly; it will hardly serve its purpose unless the items contained are provided with a definite place in the kit, so that the user can, with certainty and dispatch, reach for and get the item desired. This present kit serves this very important function very satisfactorily.

This kit box provides, in convenient form, an extended table of considerable area so that meals can be spread out on the same, dishes washed, a game of cards played, all with the maximum comfort that could be expected on an automobile trip where normal housing, hotel or motel facilities are not available. Means are provided for lighting the table for relatively short periods so that camp may be made after dark, or if desired, the travelers can get up before daylight, prepare a snack breakfast, take care of their personal cleanliness and grooming, and then when they pick up camp they have a definite place for every item that they have used. This latter function of this kit obviates a great deal of annoyance and waste of time as is normally occasioned when a search must be made through a car for a number of dis-associated bundles or boxes or packages, each containing some of the essential elements.

The principal object of my present invention therefore is to provide in a single foldable kit box the various essentials in the way of equipment and supplies to enable an automobile or small boat traveler to provide themselves with the essential elements for daily living.

A further object of this present invention is to provide a kit box in which a definite place is provided for each item that experience has indicated as essential for this type of service to the end that the user will, at all times, be able to tell by quick inspection that all the components are in place and lastly, to have the assurance of being able to readily find any element when it is desired to use the same.

A further object of this invention is to provide in a single unit capable of carrying all the essential utensils, supplies, for a few snack-type meals a table of adequate size to relieve the travelers of the necessity of assembling their various elements, eating on the ground or playing cards on the ground and then to bundle up their various elements when they wish to travel.

Further objects, advantages and capabilities will be apparent from the description and disclosure in the drawings, or may be comprehended or are inherent in the device.

In the drawings:

Figure 1 is a side elevation of a kit box made after the teachings of this present invention and showing the table portion extended in dashed lines, together with flashlights, as a lighting source, which also are shown in dashed lines;

Figures 2 and 3 are horizontal sectional views taken along lines 2—2 and 3—3 respectively of Figure 1;

Figure 1:
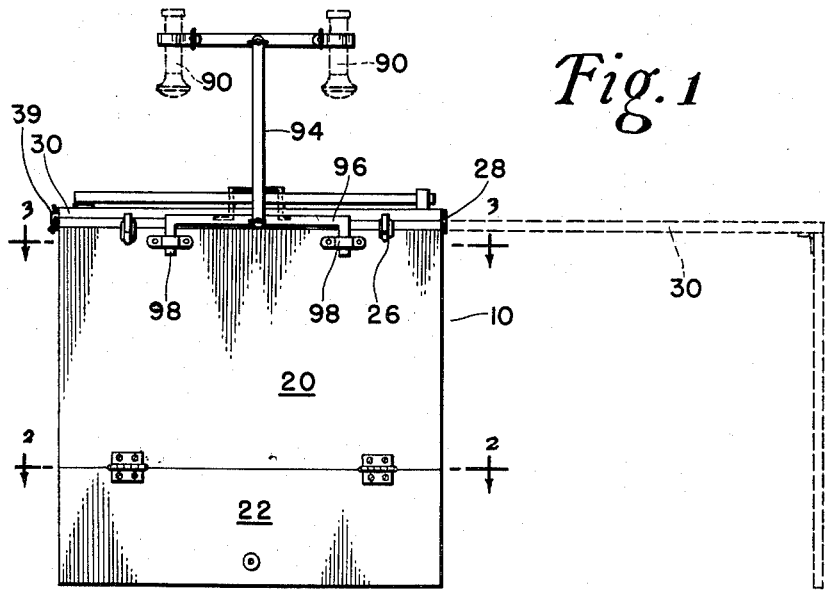
Figures 2, 3:
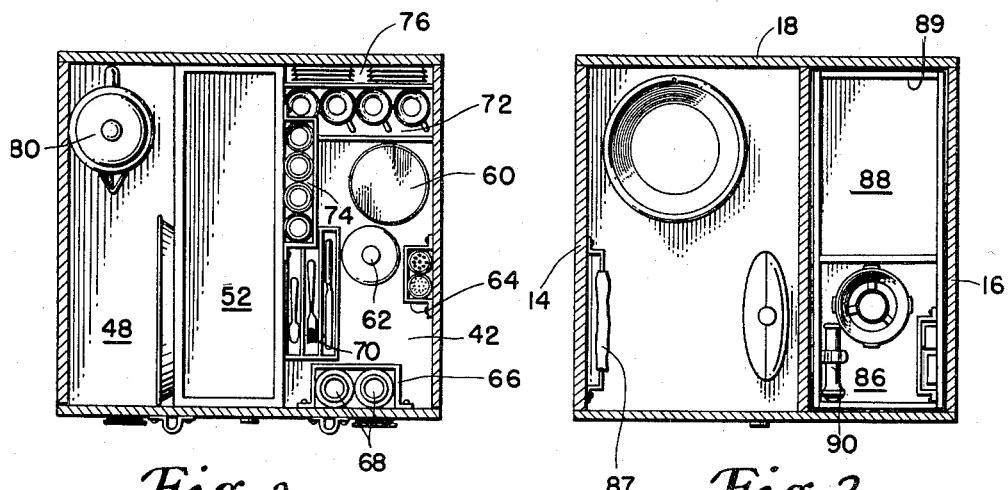
Figure 4:
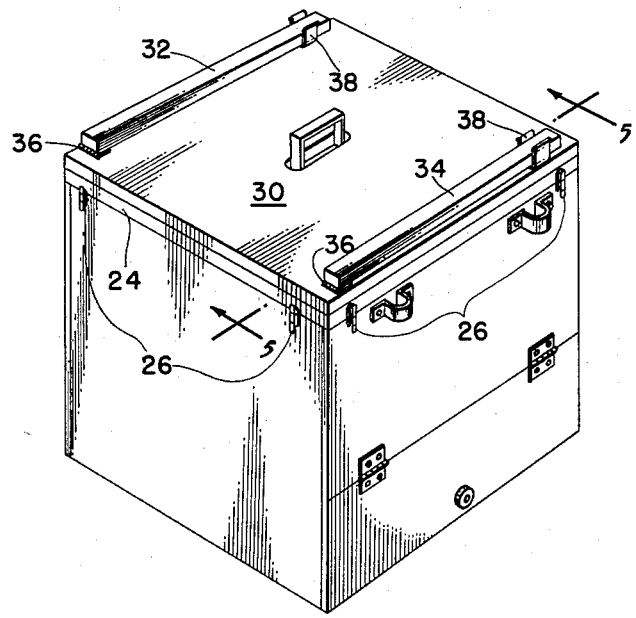
Figure 4 is a perspective view of the kit box in its folded position ready for carrying or storing in the car.
Figure 5:
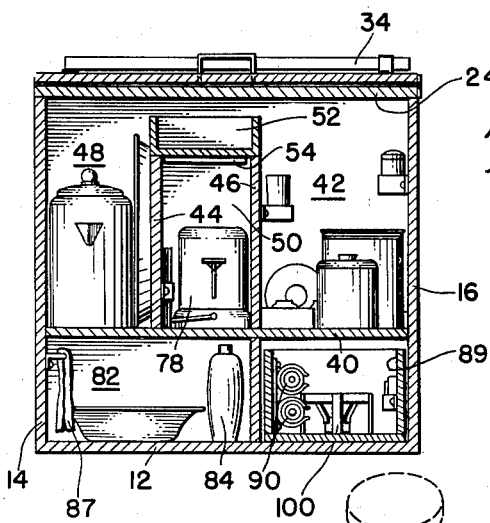
Figure 5 is a vertical sectional view taken along the line 5—5 of Figure 4.

Referring more particularly to the disclosure in the drawings, the numeral 10 designates generally the cabinet forming the principal part of my kit box. Experience has indicated that a unit substantially cubical in form, lends itself best to the multitude of uses which a kit of this order must serve if it is going to be effective. Box 10 consists of a bottom 12 and three sides, as 14, 16 and 18, which are fixedly secured to bottom 12. The fourth side 20 is also fixedly secured to side members 14 and 16, but has a lower hinged portion 2, which is hingedly secured to side 20 so as to give access to a bottom portion of the kit box. The box is completed by a removable cover 24, which is preferably clamped to the four vertical walls of the box by a plurality of toggle clamps, as 26. This arrangement permits ready access into the upper portion of the box interior. Fixedly secured, as by a plurality of hinges 28, to cover 24 is a table extension or leaf 30, which is indicated in dashed lines in Figure 1, in its using position at 30. Leaf 30 is supported in its using position by a plurality of leg members 32 and 34. These are hingedly secured to leaf 30 by hinges 36 to the top of the leaf in its transporting position. The top becomes the under side of the table leaf 30 when it is opened for use. These are held in the transporting position on the top of the kit box by resilient clamp members 38, and the leaf is clamped to the box top 24 by suitable toggle clamps 39.

Box 10 is divided vertically into two sections by the intermediate floor 40. Above floor 40 the upper compartment is divided by a double-walled partition composed of the walls 44 and 46 which extend the full width of the box and thus, in effect, divide the same into three compartments, the larger being identified as compartment 42, the extreme opposite side compartment 48 and the small central compartment 50. Compartment 50 is provided with the removable cover in the form of tray 52, This tray has such a length that it will just conveniently be possible to fit it between the opposite walls of box 10, and in order to center the same over compartment 50, centering means as two lugs 54, one on each end of the tray bottom will position the same yet offer no resistance to its easy removal or restoration.

Compartment 42 is given over to the storage of those items that are only occasionally replaced, such as condiments, coffee, sugar, and the like. A coffee canister 60, and a sugar canister 62 is provided and these are preferably not anchored in place to the end that they may be shifted about as fresh fruits, and the like, may be added to this compartment. A bracket is provided at 64 to hold salt and pepper shakers and a further bracket 66 is provided to hold preferably two thermos bottles, as 68 whose normal function is to store and preserve cream or fruit juices or the like. A plurality of compartments is provided at 70 in which may be stacked, one on top of the other, the number of knives, forks and spoons required, and this, of course, would depend upon the size of the party to be served. Space is provided at 72 to position a plurality of drinking cups and at 74 a space is provided to fit glasses which may be used for water, fruit juices, and the like. Storage is provided for a plurality of saucers at 76, which may be for general use or for coffee cups and the like.

The center section 50 is conveniently located and normally reserved for food products in their original containers or packages. A small thermos jug, as 78, is a great convenience for handling butter or items of that order. Cover 52, which is formed as an elongated tray has been found to be a most convenient arrangement for the handling of the food to be served at a meal. It is very convenient to take out the entire serving tray, place it on the table so that all the small items of food will be readily available. It serves particularly well as a sandwich box and holds the products against falling on the ground by virtue of its relatively high sides.

Compartment 48 is reserved for those cooking utensils that are apt to become blackened from use over the cooking fire. Adequate space is provided for the various low kettles and frying pans and the like, including the coffee percolator 80. This arrangement keeps dish washing to a minimum as it should not be necessary to scour the blackened outside of the kettles while on a trip, and at the same time these utensils cannot soil other items, particularly food products and the like, for which separate storage space has been provided.

Figure 6:
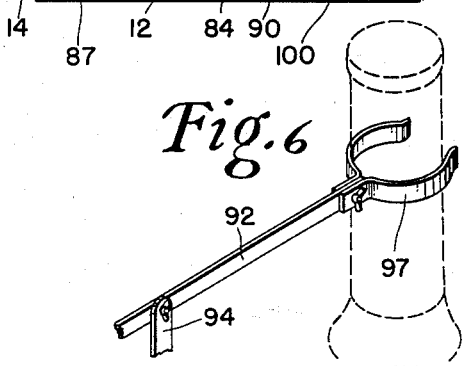
Figure 6 is a perspective view illustrating a desirable form of flashlight supporting means, showing the adjustability thereof and illustrating a conventional flashlight in dashed lines.

In the lower compartment below shelf 40 one large full length compartment 82 has been provided to accept a dish pan, wash basin, a bottle of water as 84, preferably of the metal canteen type, with adequate space remaining for hanging up of wash cloths, as 87, and to further accept the larger items, such as bath towels and the like, which have a secondary purpose in that they hold the otherwise loose elements in position during the transportation of the unit. On the opposite side of the lower compartment and below shelf 40 are the compartments 86 and 88 formed in a pull-out drawer 89. In compartment 86 is provided a plurality of flashlights 90 together with their associated brackets, as illustrated at 92, 94 and 96 in Figures 1 and 6. This bracket arrangement is provided with preferably two spring clip members 97 which are secured by the expedient of having downwardly extending ends of member 96 secured within bracket members 98, secured in turn to box 10. In this manner the flashlights 90 can be easily adjusted to substantially fully light the work table or they may be similarly employed to light the interior of kit box 10 once the protecting cover has been removed from the same, and to this end it is desirable that the bracket arrangement be outside of the upper projection of the cover members so that they can serve this dual purpose.

Also within compartment 86 is a cooking or heating stove 100. A very convenient heating means is the small light weight units which use solidified fuels of the order of alcohol impregnated briquettes or the like, or the various alcohol fuels which are supplied in covered containers.

It is believed that it will be clearly apparent from the above description and the disclosure in the drawings that the invention comprehends a novel construction of an automobile travel kit box.

Having thus disclosed the invention, I claim:

1. A traveling kit box, comprising: a box having an upper and a lower compartment and having a lower side door operable upwardly and a top door openable to provide access to the upper and lower compartments, said compartments being subdivided into a series of chambers providing room for storage of washing, eating and cooking equipment and supplies, said box having a leaf member hingedly connected to one upper side edge thereof and rotatable from a first position covering said box top to a horizontal second position to the side of said box and supporting legs for said leaf in said second position, said legs being hinged to said leaf and folded flat on its upper or folded surface, and securing means manually operable to secure said top door and said leaf in place for carrying and said top door having a centrally positioned handle for carrying the box, said handle passing through a slot in said leaf when the box is closed for carrying.

2. An automobile travel kit box, comprising: a box substantially cubical in form when closed; a cover member hingedly secured to one of the sides and provided with securing means to secure it fully to the box and permit carrying the box thereby; a second cover member of identical size hingedly secured to the first cover member and adapted to lie flat on top of the same in the carrying position legs hingedly secured to said second cover member and adapted to support said second cover member in continuation of the first cover member to form a single level table; said box being horizontally divided approximately ⅓ way up from the bottom of the box to provide lower storage compartments; a drawer adapted to fit in one of said lower compartments and adapted to be removed therefrom for easy access to the elements provided; said upper ⅔ of the box forming a large compartment divided for part of its heighth by two partitions extending from wall to wall and providing a central secondary storage chamber; a tray adapted to be supported by said partitions and to have this same transverse width as occupied by the two partitions so the tray may sit on top of the partition and form a cover therefor and means for positioning said tray on said partitions; said tray adapted to be easily removed and intended to form storage for small items of frequent use so that the tray may be lifted out and placed at a convenient point for use; one side portion of said box, parallel to said partitions, and extending from the horizontal partition downwardly adapted to hinge downwardly to give access to said lower compartments.

References Cited in the file of this patent

UNITED STATES PATENTS

| | | |
|---|---|---|
| 1,176,203 | Comer | Mar. 21, 1916 |
| 1,731,325 | Stevens | Oct. 15, 1929 |
| 1,984,345 | Kennedy | Dec. 11, 1934 |
| 2,197,034 | Douglass | Apr. 16, 1940 |
| 2,335,896 | Anderson | Dec. 7, 1943 |
| 2,550,108 | Davis | Apr. 24, 1951 |
| 2,655,420 | Hadley | Oct. 13, 1953 |

FOREIGN PATENTS

| | | |
|---|---|---|
| 432,358 | France | Dec. 5, 1911 |
| 708,768 | Great Britain | May 12, 1954 |

UNITED STATES PATENT OFFICE
CERTIFICATION OF CORRECTION

Patent No. 2,939,756                 June 7, 1960

Maude L. Butcher

It is hereby certified that error appears in the above numbered patent requiring correction and that the said Letters Patent should read as corrected below.

Column 3, lines 15 and 29, for "thermos", each occurrence, read -- vacuum --.

Signed and sealed this 29th day of August 1961.

(SEAL)
Attest:

ERNEST W. SWIDER
Attesting Officer

DAVID L. LADD
Commissioner of Patents